United States Patent
Gao et al.

(10) Patent No.: US 10,452,479 B2
(45) Date of Patent: Oct. 22, 2019

(54) EVALUATION FOR REBUILDING PERFORMANCE OF REDUNDANT ARRAYS OF INDEPENDENT DISKS

(71) Applicant: EMC IP Holding Company LLC, Hopkinton, MA (US)

(72) Inventors: Jian Gao, Beijing (CN); Hongpo Gao, Beijing (CN); Geng Han, Beijing (CN); Jibing Dong, Beijing (CN); Xinlei Xu, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 127 days.

(21) Appl. No.: 15/461,011

(22) Filed: Mar. 16, 2017

(65) Prior Publication Data

US 2017/0270002 A1    Sep. 21, 2017

(30) Foreign Application Priority Data

Mar. 16, 2016    (CN) .......................... 2016 1 0151489

(51) Int. Cl.
| | |
|---|---|
| G06F 11/00 | (2006.01) |
| G06F 11/10 | (2006.01) |
| G06F 3/06 | (2006.01) |
| G06F 11/16 | (2006.01) |

(52) U.S. Cl.
CPC ........ *G06F 11/1092* (2013.01); *G06F 3/0604* (2013.01); *G06F 3/065* (2013.01); *G06F 3/0611* (2013.01); *G06F 3/0634* (2013.01); *G06F 3/0688* (2013.01); *G06F 3/0689* (2013.01); *G06F 11/1666* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,165,095 B2 * | 1/2007 | Sim | .................. | G06F 17/30194 709/217 |
| 8,880,801 B1 * | 11/2014 | Robins | ................ | G06F 12/0246 711/114 |
| 2014/0358994 A1 * | 12/2014 | Liu | ........................ | H04L 67/26 709/203 |

* cited by examiner

*Primary Examiner* — Amine Riad
(74) *Attorney, Agent, or Firm* — Brian J. Colandreo; Mark H. Whittenberger; Holland & Knight LLP

(57) ABSTRACT

Embodiments of the present disclosure provide a solution of evaluating a rebuilding performance of a redundant array of independent disks. In some embodiments, there is provided a computer-implemented method, comprising: simulating, based on a first group of redundant arrays of independent disks, a rebuilding process for a second group of redundant arrays of independent disks; obtaining a first performance metric of the simulated rebuilding process; and identifying a factor associated with the rebuilding performance of the second group of redundant arrays of independent disks based on the first performance metric.

20 Claims, 12 Drawing Sheets

FIG. 8

EVALUATION FOR REBUILDING PERFORMANCE OF REDUNDANT ARRAYS OF INDEPENDENT DISKS

RELATED APPLICATIONS

This application claim priority from Chinese Patent Application Number CN201610151489.1, filed on Mar. 16, 2016 at the State Intellectual Property Office, China, titled "EVALUATION FOR REBUILDING PERFORMANCE OF REDUNDANT ARRAY OF INDEPENDENT DISKS" the contents of which is herein incorporated by reference in its entirety.

FIELD

Embodiments of the present disclosure generally relate to data storage, and more specifically to evaluation of rebuilding performance of redundant arrays of independent disks (RAID).

BACKGROUND

RAID (redundant array of independent disks) is a data storage virtualization technology, which combines a plurality of physical disk drives into a single logic unit for the purposes of data redundant backup and/or performance improvement. With RAID 5 as an example, it may include block-level stripes having distributed check information. When a single disk fails, the subsequent reading can be calculated through the distributed check information, such that no data will be lost. Meanwhile, a spare disk will be selected to replace the failing disk, and all data on the failing disk will be rebuilt and written onto the spare disk. Because in the conventional RAID, an RAID group (RG) will consume all disk space within this group, which will cause the following problems: (1) if a single disk fails, the write input/output (10) for rebuilding will be directed to a unique spare disk; therefore, bandwidth of the spare disk will become a bottleneck for rebuilding performance. (2) user IOs for a same RG will be affected seriously, and response time of these user IOs will increase significantly, because IO performance of the RG is limited by the slowest disk of this RG; and in the case of rebuilding, the disk in the rebuilding will limit the user IO performance. (3) Because disk capacity increases yearly, the two problems above are magnified, thereby causing a larger risk of data loss to the user.

A next generation RAID technology (also referred to as "mapped RAID technology") may be introduced to solve the problem above. The mapped RAID may include more disks than conventional RAIDs. When creating the RAID stripes, a plurality of disk segments may be randomly selected from a plurality of disks, such that the data and check information are finally distributed in all disks. When one disk fails, for each disk segment on the failing disk, one disk segment on other disks may be randomly selected as an alternative. Therefore, with this technology, all disks will be involved in the rebuilding process. Because a single spare disk does not exist and writing in a plurality of disk segments can be executed in parallel, the entire rebuilding time will be decreased.

However, due to the complexity of the model of mapped RAID, it is an issue regarding how to evaluate its rebuilding performance before implementation. Besides, the Chinese patent application No. 201610103823.6 entitled "Method and Device for Guaranteeing Reliability of Redundant Array of Independent Disks," which was filed on Feb. 25, 2016, mentioned a relationship between rebuilding rate of the mapped RAID, the number of disks and its reliability. Therefore, a problem to be solved in the art is to determine, for a specific mapped RAID model, whether its rebuilding performance can satisfy its requirements of reliability.

Therefore, there is needed a more efficient solution for evaluating rebuilding performance of RAID in the art to solve the problem described above.

SUMMARY

Embodiments of the present disclosure are intended to provide a solution for evaluating rebuilding performance of RAID so as to solve the problems existing in the prior art.

According to a first aspect of the present disclosure, there is provided a computer-implemented method. The method comprises simulating, based on a first group of redundant arrays of independent disks, a rebuilding process for a second group of redundant arrays of independent disks. The method further comprises obtaining a first performance metric of the simulated rebuilding process. The method further comprises identifying, based on the first performance metric, a factor associated with rebuilding performance of the second group of redundant arrays of independent disks.

In some embodiments, the first group of redundant arrays of independent disks includes a group of conventional redundant arrays of independent disks, and the second group of redundant arrays of independent disks includes a group of mapped redundant arrays of independent disks.

In some embodiments, simulating the rebuilding process for the second group of redundant arrays of independent disks using the first group of redundant arrays of independent disks comprises: disabling a disk in the first group of redundant arrays of independent disks and disabling rebuilding of the first group of redundant arrays of independent disks; initiating, via an input output generator, a read request for data in the disabled disk; and in response to receiving the requested data, writing the requested data to a spare disk via the input output generator.

In some embodiments, the input output generator includes a common input output generator or a private input output generator.

In some embodiments, the input output generator is used for initiating at least one of a read request and a write request for at least one of the following: a volume, a logic unit number, a group of redundant arrays of independent disks, and a disk.

In some embodiments, simulating the rebuilding process for the second group of redundant arrays of independent disks using the first group of redundant arrays of independent disks further comprises: disabling a plurality of disks in one or more first groups of redundant arrays of independent disks, and disabling rebuilding of the one or more first groups of redundant arrays of independent disks; initiating, via a plurality of input output generators, a plurality of read requests for a plurality of data in the plurality of disabled disks concurrently; and in response to receiving the requested plurality of data, writing concurrently the requested plurality of data into one or more spare disks via the plurality of input output generators.

In some embodiments, the method further comprises: re-simulating a rebuilding process for the second group of redundant arrays of independent disks by changing at least one of the following: the number of the plurality of input output generators, and the number of the one or more spare disks.

In some embodiments, obtaining the first performance metric of the simulated rebuilding process comprises: obtaining at least one of the following performance metrics of the simulated rebuilding process: rebuilding rate, usage of a central processing unit, and usage of memory.

In some embodiments, obtaining the first performance metric of the simulated rebuilding process comprises: obtaining a second performance metric of the simulated rebuilding process.

In some embodiments, identifying a factor associated with the rebuilding performance of the second group of redundant arrays of independent disks comprise: identifying a factor associated with the rebuilding performance of the second group of redundant arrays of independent disks by comparing the first and the second performance metric.

According to a second aspect of the present disclosure, there is provided an electronic device. The device comprises at least one processing unit and at least one memory. The at least one memory is coupled to the at least one processing unit with instructions being stored thereon, the instructions, when executed by the at least one processing unit, performing actions including: simulating, based on a first group of redundant arrays of independent disks, a rebuilding process for a second group of redundant arrays of independent disks; obtaining a first performance metric of the simulated rebuilding process; and identifying a factor associated with the rebuilding performance of the second group of redundant arrays of independent disks based the first performance metric.

In some embodiments, the first group of redundant arrays of independent disks includes a group of conventional redundant arrays of independent disks, and the second group of redundant arrays of independent disks includes a group of mapped redundant arrays of independent disks.

In some embodiments, simulating the rebuilding process for the second group of redundant arrays of independent disks using the first group of redundant arrays of independent disks comprises: disabling a disk of the first group of redundant arrays of independent disks and disabling rebuilding of the first group of redundant arrays of independent disks; initiating, via an input output generator, a read request for data in the disabled disk; and in response to receiving the requested data, writing the requested data to the spare disk via the input output generator.

In some embodiments, the input output generator includes a common input output generator or a private input output generator.

In some embodiments, the input output generator is used for initiating at least one of a read request and a write request for at least one of the following: a volume, a logic unit number, a group of redundant arrays of independent disks, and a disk.

In some embodiments, simulating a rebuilding process for the second redundant array of independent disks using the first redundant array of independent disks further comprises: disabling a plurality of disks in one or more first groups of redundant arrays of independent disks, and disabling rebuilding of the one or more first groups of redundant arrays of independent disks; initiating, via a plurality of input output generators, a plurality of read requests for a plurality of data in the plurality of disabled disks concurrently; and in response to receiving the requested plurality of data, writing concurrently the plurality of requested data to the one or more spare disks via the plurality of input output generators.

In some embodiments, the actions further include: re-simulating a rebuilding process for the second group of redundant arrays of independent disks by changing at least one of the following: the number of the plurality of input output generators, and the number of the one or more spare disks.

In some embodiments, obtaining the first performance metric of the simulated rebuilding process comprises: obtaining at least one of the following performance metrics of the simulated rebuilding process: rebuilding rate, usage of a central processing unit, and usage of memory.

In some embodiments, obtaining the first performance metric of the simulated rebuilding process comprises: obtaining a second performance metric of the simulated rebuilding process.

In some embodiments, identifying a factor associated with the rebuilding performance of the second group of redundant arrays of independent disks comprise: identifying a factor associated with the rebuilding performance of the second group of redundant arrays of independent disks by comparing the first and the second performance metric.

According to a third aspect of the present disclosure, there is provided a computer readable storage medium. The computer readable storage medium has computer-readable program instructions stored thereon. The computer-readable program instructions are used for executing steps of the method according to the first aspect described above.

Compared with the prior art, embodiments of the present disclosure can simulate the rebuilding process for the mapped RAID based on the conventional RAID technology, thereby being capable of evaluating its rebuilding performance without implementing a specific mapped RAID. Besides, the embodiments of the present disclosure can identify a factor that affect the rebuilding performance of the mapped RAID, thereby being capable of providing correct directions and reasonable suggestions for specific implementation of the mapped RAID.

The Summary is used to introduce selection of concepts in the form of simplification, which will be further described in the detailed description below. The Summary has no intention to identify key features or essential features of the present disclosure or limit the scope of the present disclosure.

BRIEF DESCRIPTION OF THE DRAWINGS

Through the following detailed description with reference to the accompanying drawings, the above and other objects, features, and advantages of embodiments of the present disclosure will become more comprehensible. In the drawings, several embodiments of the present disclosure are illustrated in an exemplary but non-limitative manner, in which:

FIG. 8 illustrates a schematic diagram of distributed rebuilding of the mapped RAID:

In various figures, like or corresponding reference number represents same or corresponding part.

DETAILED DESCRIPTION

Hereinafter, various exemplary embodiments of the present disclosure will be described in detail with reference to the accompanying drawings. It should be noted that these drawings and description are only exemplary embodiments. It should be noted that according to the subsequent description, alternative embodiments of the structure and method disclosed herein are also easily envisaged and used without departing from the claimed principle of the present disclosure.

It should be understood that these exemplary embodiments are provided only for enabling those skilled in the art to better understand and then further implement the present disclosure, not for limiting the scope of the present disclosure in any manner.

As used herein, the terms "comprise," "include" and its variants should be construed as open-ended terms, that is, "include, but not limit to." The term "based on" is construed as "at least partly based on." The term "an embodiment" and "one embodiment" are construed as "at least one embodiment" The term "another embodiment" is construed as "at least one another embodiment." Relevant definitions of other terms will be provided in the depiction below.

Hereinafter, a solution for evaluating rebuilding performance of RAID according to the embodiments of the present disclosure will be described in detail with reference to the accompanying drawings. For the purpose of description, embodiments of the present disclosure will be described in detail with a RAID 5 having 4 data blocks and 1 check block (4D+1 P) as an example. However, it should be understood that the principle and method of the embodiments of the present disclosure may be applied to RAIDs of any levels or layout, not limited to the examples listed here. Moreover, the protection scope of the present disclosure is not limited in this aspect.

Figure 1:
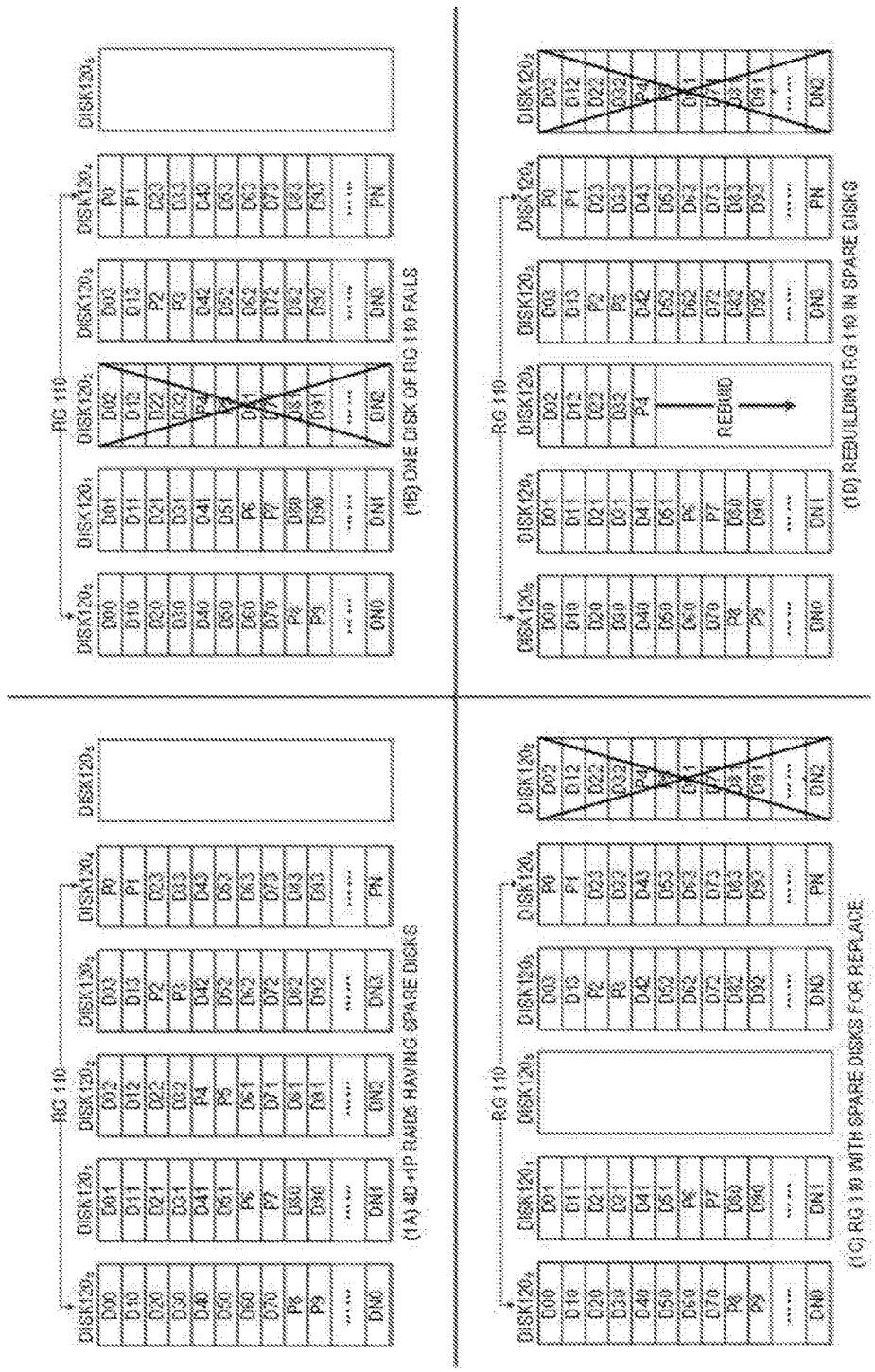
FIG. 1 illustrates a schematic diagram of rebuilding conventional RAID.

FIG. 1 illustrates a schematic diagram of rebuilding of a conventional RAID. The conventional RAID consists of block-level stripes having distributed check information. The check information may be distributed in a plurality of disks. FIG. 1 illustrates RG110, which is RAID 5 with 4 data blocks and 1 check block (4D+1P). As illustrated by (1A) of FIG. 1, RG 110 uses 5 disks, which are respectively disk $120_0$, disk $120_1$, disk $120_2$, disk $120_3$, and disk $120_4$. In addition, RG 110 uses disk $120_5$ as its spare disk, each stripe of RG 110 may comprise 5 blocks that include 4 data blocks (i.e., blocks for storing D00, D01, . . . DN3) and 1 check block (i.e., block for storing P0, P1 . . . PN). (1B) in FIG. 1 illustrates that a disk (e.g., disk $120_2$) in RG 110 fails. At this time, as illustrated by (1C) in FIG. 1, the spare disk (e.g., disk $120_5$) will replace the failing disk (i.e., disk $120_2$); moreover, as shown by (1D) in FIG. 1, all data on the failing disk (i.e., disk $120_2$) will be rebuilt and written into the spare disk (i.e., disk $120_5$).

Figure 2:
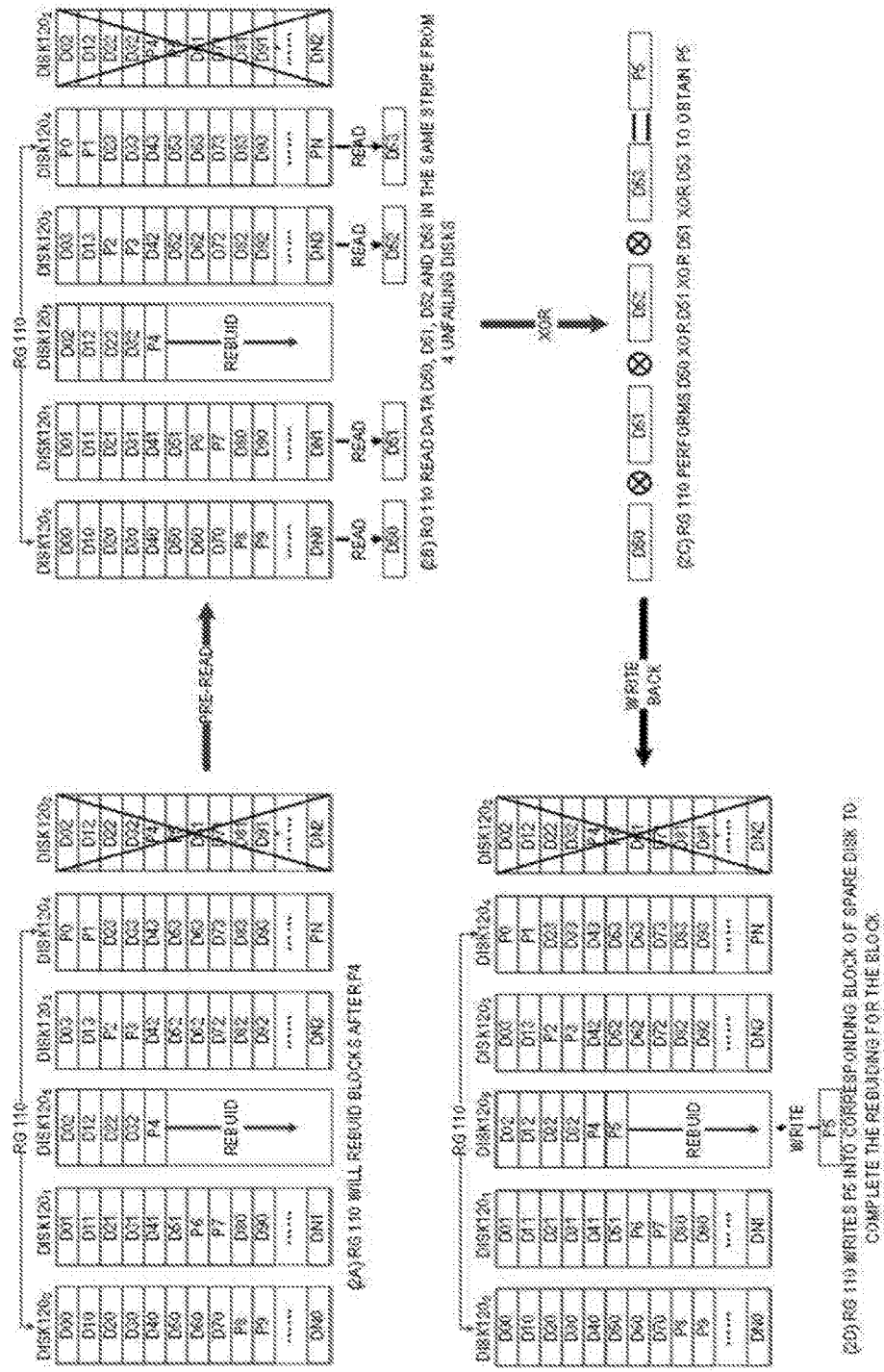
FIG. 2 illustrates a schematic diagram of internal behaviors of conventional RAID for rebuilding.

FIG. 2 further illustrates a schematic diagram of internal behaviors of RG 110 for rebuilding as shown in FIG. 1. The internal behaviors for rebuilding may comprise three steps: pre-read, exclusive or (XOR), and write back. As already described with reference to FIG. 1, the disk $120_2$ in RG 110 fails, and all data on the disk $120_2$ will be rebuilt and written into the disk $120_5$ (i.e., spare disk). For example, as illustrated by (2A) in FIG. 2, the RG 110 will rebuild blocks after P4. The first step is pre-reading, as shown by (2B) in FIG. 2, in which the RG 110 reads data D50, D51, D52, and D53 in the same stripe from 4 unfailing disks (i.e., disk $120_0$, disk $120_1$, disk $120_3$, and disk $120_4$), respectively; the next step is XOR, as shown by (2C) in FIG. 2, in which the RG 110 performs an XOR operation to the read data so as to obtain data stored in the corresponding block of the failing disk (e.g., D50 XOR D51 XOR D52 XOR D53=P5); the final step is write back, as illustrated by (2D) in FIG. 2, in which the RG 110 writes a result (e.g. P5) of the XOR operation into the corresponding block of the spare disk so as to complete rebuilding for this block.

For implementation of most conventional RAID technologies, rebuilding performed by the RAID per se may be disabled. For example, when rebuilding of the RG 110 is disabled, if the disk $120_2$ in RG 110 fails, the RG 110 will not perform hot standby (i.e., the spare disk will not replace the failing disk) and subsequent behaviors (e.g., internal behaviors for rebuilding as shown in FIG. 2) will not occur. The RG 110 will be in a degraded state. For example, the RG 110 will stay in the state shown by (1B) of FIG. 1.

Figure 3:
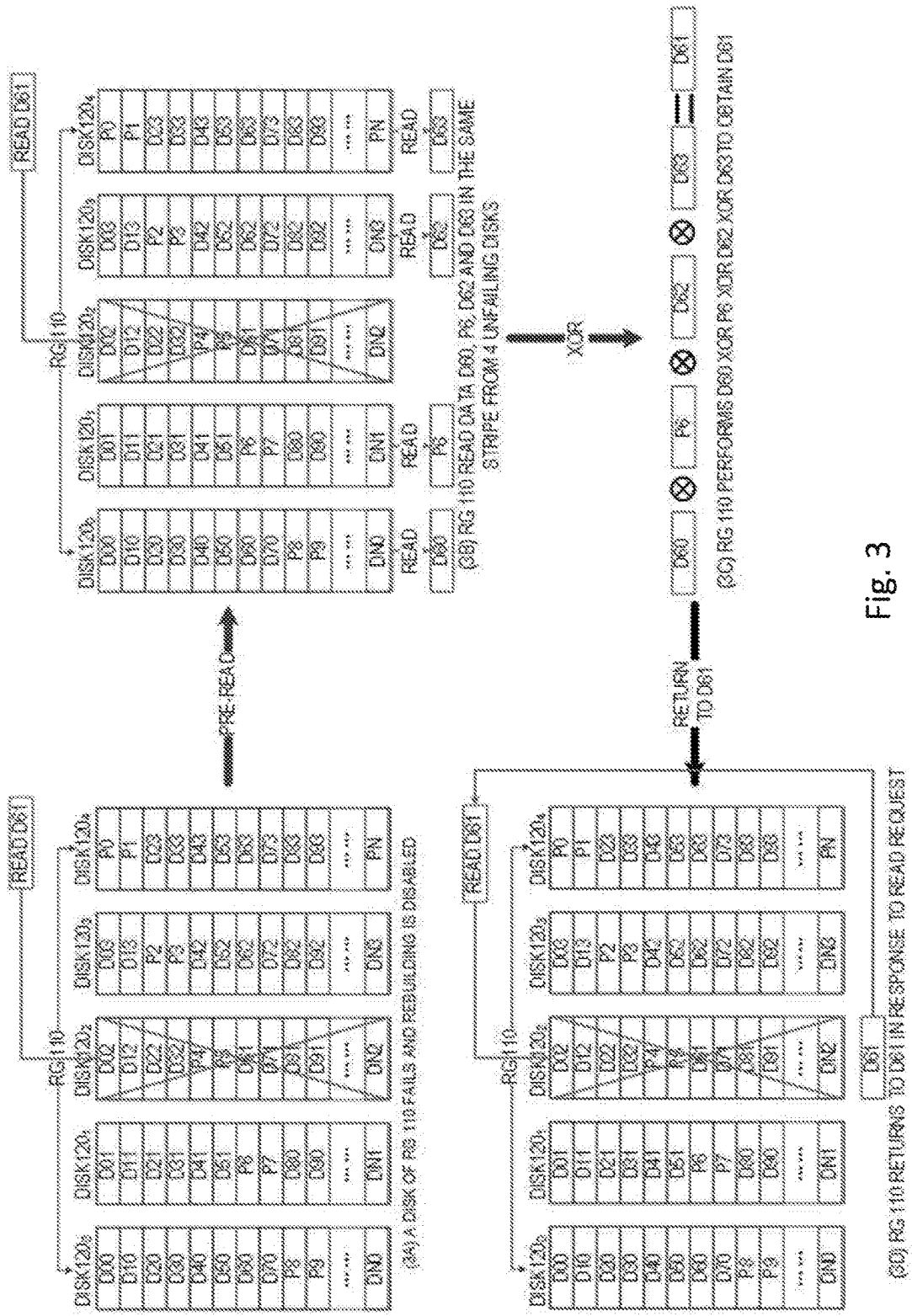
FIG. 3 illustrates a schematic diagram of process of initiating a read request for data in a failing disk when the conventional RAID is in a degraded state.

FIG. 3 illustrates a schematic diagram of a process of initiating a read request for data in the failing disk when the RAID is in a degraded state. As illustrated by (3A) in FIG. 3, the disk $120_2$ in RG110 fails and rebuilding of the RG 110 is disabled; therefore, the RG 110 is in a degraded state. At this point, a read request may be initiated for data in the failing disk $120_2$, e.g., the read request may be a read request for data D61. Because the disk $120_2$ has already fails and the RG 110 is in a degraded state, the RG 110 needs to read other data in the same stripe from other unfailing disks and then perform an XOR operation to obtain data in corresponding blocks of the failing disk. The first step is pre-reading, as shown by (3B) in FIG. 3, in which the RG 110 read data D60, P6, D62, and D63 in the same stripe from 4 unfailing disks (i.e., disk $120_0$, disk $120_1$, disk $120_3$, and disk $120_4$), respectively; the next step is XOR, as shown by (3C) in FIG. 3, in which the RG 110 performs an XOR operation on the read data so as to obtain data stored in the corresponding block in the failing disk (e.g., D60 XOR P6 XOR D62 XOR D63=D61); finally, the RG 110 may return a result of the XOR operation (i.e., D6.1) in response to the read request.

It may be seen by comparing FIG. 2 and FIG. 3 that the process of rebuilding the failing disk of the RG is similar to the process in which the RG in the degraded state processes the read operation on the failing disk. Their differences lie only in: (1) in the case of rebuilding, hot standby will occur (i.e., the spare disk will replace the failing disk); (2) in the case of rebuilding, a result of XOR operation will be written back to the spare disk; while when the RG is in a degraded state, the result of XOR operation is returned (e.g., returned to the IO requestor) only in response to the read request.

Based on the above differences, the embodiments of the present disclosure propose to simulate the rebuilding process for the RAID using an I/O generator, thereby obtaining a solution of the rebuilding performance of RAID. The IO generator is a tool usually for many purposes of the RAID technologies, such as performance evaluation of RAID, resource consumption measurement under a specific IO load, etc. The IO generator may be classified into a common IO generator and a private IO generator; the common IO generator usually generates an IO for a standard block device, which is exposed to the host by RAID. For example, the IO Meter is a common IO generator used widely, which can only generate the IO for the block device (e.g., corresponding to logic unit number (LUN)-level IO in the RAID technology). The private IO generator usually needs to be developed for specific needs, which can usually generate the IO for the intermediate disk or component. Without explicit indication, the IO generator in the embodiments of the present disclosure may be either of the common IO generator and the private IO generator and may be used for initiating at least one of a read request and a write request for at least of the following: a volume, LUN, RG, and disk. Besides, the IO generator may be implemented in software, hardware and/or a combination thereof. For example, when the IO generator is implemented in software manner, it may be implemented as an application or a process or thread of the application.

Figure 4:
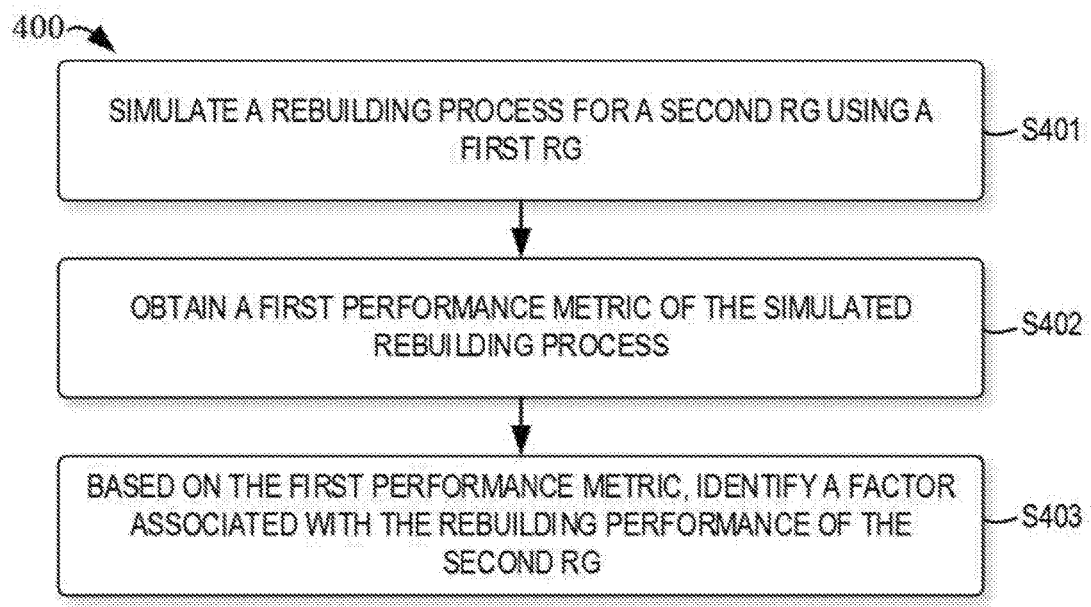
FIG. 4 illustrates a flowchart of a method 400 for evaluating rebuilding performance of an RAID according to the embodiments of the present disclosure.

FIG. 4 illustrates a flow diagram of a method 400 for evaluating rebuilding performance of RAID according to the embodiments of the present disclosure. As illustrated in FIG. 4, the method 400 may comprise steps S401-S402.

In step S401, the rebuilding process for the second RG is simulated using the first RG. The first RG described herein may be a conventional RG (e.g., a conventional RAID 5 with 4D+1P is still taken as the example of a conventional RG). The second RG described herein may be an RG for evaluating the rebuilding performance, which may be a conventional RG (e.g., conventional RAID 5 with 4D+1P), a mapped RAID group mentioned above, or an RG with a different configuration.

Figure 5:
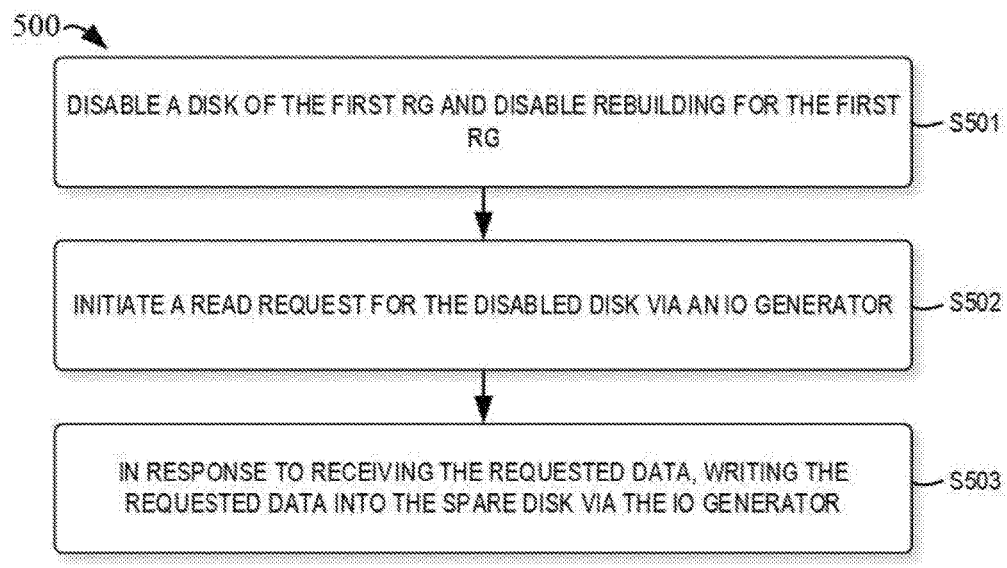
FIG. 5 illustrates a flowchart of a method 500 for simulating a rebuilding process for an RAID using an IO generator according to the embodiments of the present disclosure.
Figure 6:
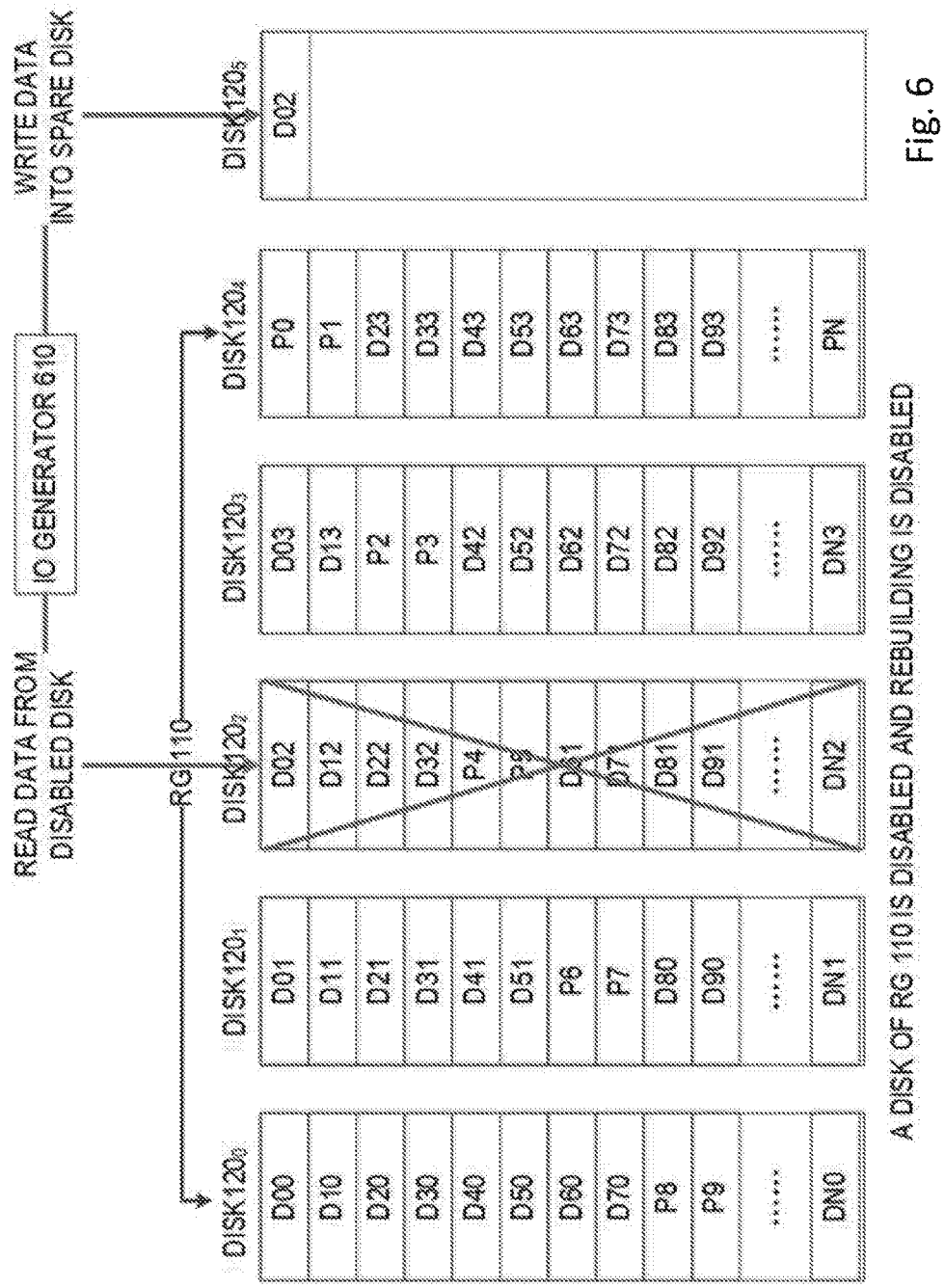
FIG. 6 illustrates a schematic diagram of simulating a rebuilding process of a conventional RAID using an IO generator according to the embodiments of the present disclosure.

According to the embodiments of the present disclosure, a rebuilding process for the second RG may be simulated using an IO generator. For example, FIG. 5 illustrates a flow diagram of a method 500 of simulating a rebuilding process for RAID using an IO generator according to the embodiments of the present disclosure. Hereinafter, the method 500 will be described in detail with reference to FIG. 6, in which FIG. 6 illustrates a schematic diagram of simulating the rebuilding process for the conventional RAID using an IO generator according to the embodiments of the present disclosure. FIG. 6 shows an RG 110 and an IO generator 610. For example, the IO generator 610 may be used to execute the method 500. As illustrated in FIG. 5, the method 500 may comprise steps S501-S503. At step S501, a disk in the first RG is disabled and rebuilding of the first RG is disabled. For example, as illustrated in FIG. 6, the disk $120_2$ in the RG 110 is disabled and rebuilding of the RG 110 is disabled, such that the RG 110 is in a degraded state. Next, the method 500 proceeds to step S502. In step S502, a read request is initiated for data in the disabled disk via the IO generator. For example, as shown in FIG. 6, the IO generator 610 initiates a read request for data in the disk $120_2$ in the RG 110. As described above in conjunction with FIG. 3, because the RG 110 is in a degraded mode, the read request for the disabled disk $120_2$ in the RG 110 will trigger the RG 110 to read corresponding data from the other 4 disks (namely, disk $120_0$, disk $120_1$, disk $120_3$, and disk $120_4$), respectively, to perform XOR to the data from the 4 disks to obtain the data in the disabled disk and to return the obtained data to the IO generator 610. Next, the method 500 proceeds to step S503. In step S503, in response to receiving the requested data, the requested data is written to the spare disk via the IO generator. For example, as illustrated in FIG. 6, the IO generator 610 writes the obtained data into the disk $120_5$. Till now, the method 500 ends.

Return to FIG. 4. Next, the method 400 proceeds to step S402. In step S402, a first performance metric of the simulated rebuilding process is obtained. According to the embodiments of the present disclosure, the first performance metric may comprise at least one of the following performance metrics: rebuilding rate (MB/S), usage of a central processing unit (CPU), and usage of memory, etc.

It should be noted that when simulating the rebuilding process for the RAID using the IO generator, the check block in the RG is invisible to the IO generator, i.e., the IO generator cannot generate a read request for the check block, while the actual rebuilding process will cause all space including the check block to be rebuilt in the spare disk. According to the embodiments of the present disclosure, a mathematic method may be utilized to solve this problem. For example, in a RAID 5 with 4D+1P, 20% of the capacity in each disk is the check block. Therefore, when simulating the rebuilding process for RAID using the IO generator, simulation may be performed only to the rebuilding process of the data block occupying 80% of the disk capacity, obtaining the performance metric for the rebuilding process of the data area. Then, the performance metric for the rebuilding process of all spaces in the disk may be calculated based on a fixed ratio of the data area and the check area in the specific RAID configuration (e.g., in the RAID 5 with 4D+1P, the ratio is 4:1).

Next, the method 400 proceeds to step S403. In step S403, a factor associated with the rebuilding performance of the second RG is identified based on the first performance metric. For example, as will be further described, a plurality of performance metrics may be obtained by changing the configuration parameters used in the simulation, and the factor that will affect the rebuilding performance of RAID may be identified by comparing the plurality of performance metrics.

Till now, the method 400 ends.

As mentioned above, the mapped RAID may be introduced to solve various problems existing in the conventional RAID; the solution for evaluating rebuilding performance of RAID according to the embodiments of the present disclosure may be used for the mapped RAID so as to evaluate its rebuilding performance without implementation of the specific mapped RAID.

Figure 7:
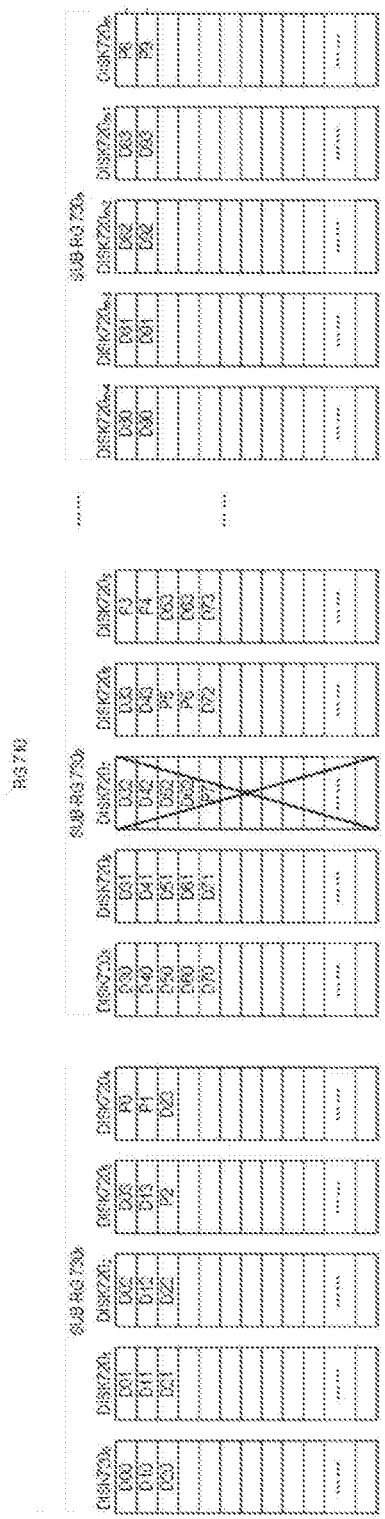
FIG. 7 illustrates a schematic diagram of a mapped RAID having one kind of configuration.
Figure 8:
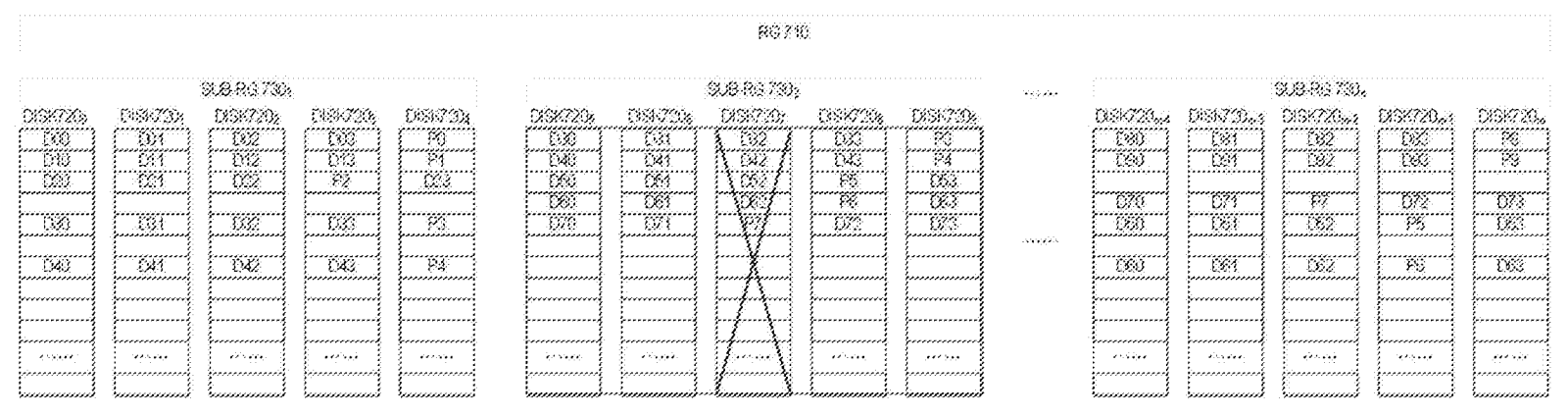

For example, FIG. 7 illustrates a schematic diagram of a mapped RAID having one type of configuration. FIG. 7 illustrates RG 710 which uses m+1 disks, i.e., disks $720_0$, $720_1, \ldots, 720_m$. The m+1 disks are organized into a plurality of sub-RGs, i.e., sub-RG $730_1$, $730_2, \ldots,$ G$730_n$, wherein each sub-RG is configured as a RAID 5 with 4D+1P. When one disk in any sub-RG of the RG 710 fails, for example, the disk $720_7$ in the sub-RG $730_2$ shown in FIG. 7 fails, rebuilding may be performed for the failing disk $720_7$ and the associated stripe, thereby distributed rebuilding the stripes on the sub-RG $730_2$ onto any other disks in other sub-RGs. The sub-RG $730_2$ may be marked as offline till the spare disk is replaced into the sub-RG $730_2$, and then the sub-RG $730_2$ may be resumed to the optimal state. For example, FIG. 8 illustrates a schematic diagram of distributed rebuilding of the RG 710. As illustrated in FIG. 8, two stripes on the sub-RG $730_2$ are rebuilt onto the sub-RG $730_1$, and the other three stripes on the sub-RG $730_2$ are rebuilt onto the sub-RG $730_n$.

It may be seen with reference to FIGS. 7 and 8 that rebuilding for the mapped RAID with this configuration has the following features: (1) parallel or distributed rebuilding, i.e., the associated stripes may be rebuilt onto a plurality of disks, rather than a specific spare disk of the conventional RAID. (2) during the rebuilding process, the pre-reading operation will be directed to a group of disks or a sub-RG. For example, as illustrated in FIG. 7, when the disk $720_7$ fails, the pre-reading operation during the rebuilding process will be directed to the sub-RG $730_2$ or to the disks $720_5$, $720_6$, $720_8$, and $720_9$.

Figure 9:
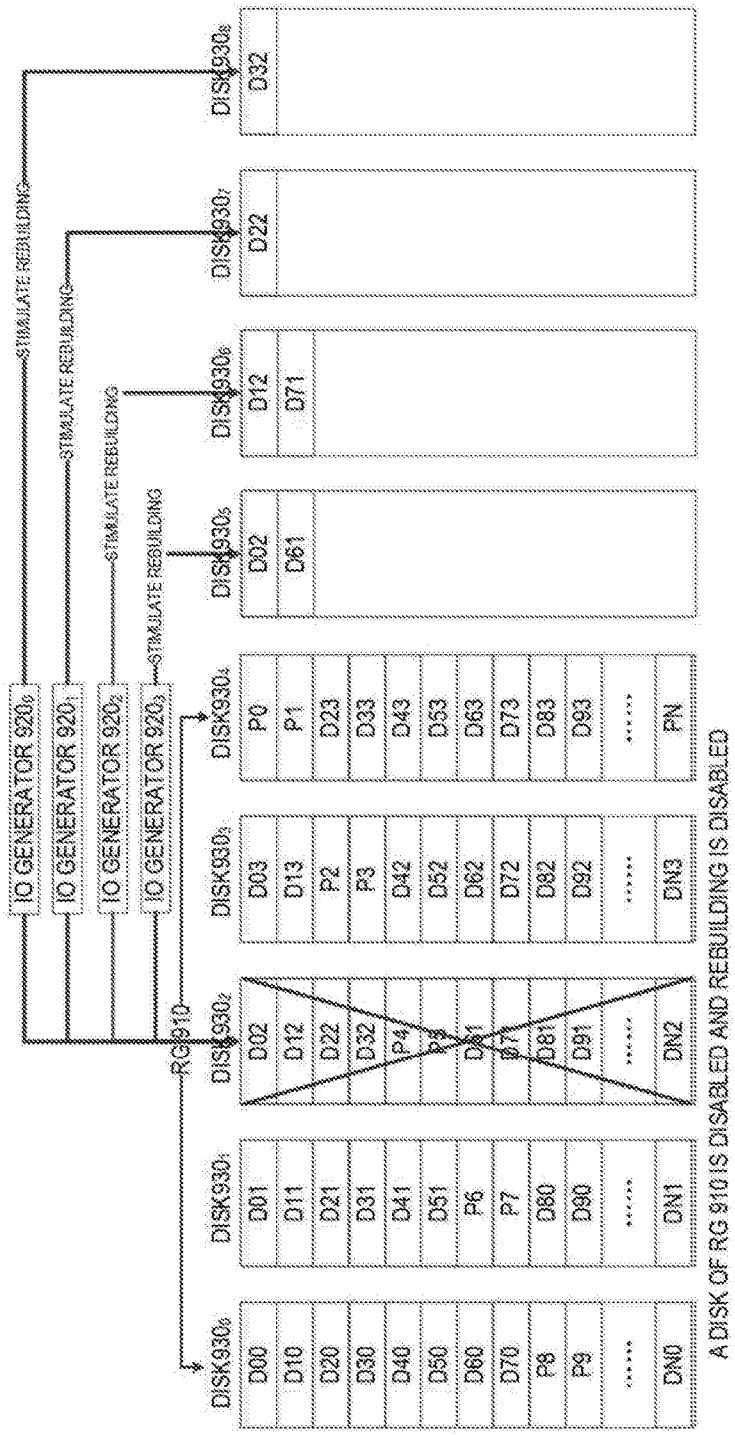
FIG. 9 illustrates a schematic diagram of simulating a rebuilding process for the mapped RAID based on the conventional RAID according to the embodiments of the present disclosure.

Based on the features above, the rebuilding process for the RG 710 as shown in FIG. 7 may be simulated using the IO generator based on the conventional RAID, thereby obtaining a performance metric for its rebuilding. For example, FIG. 9 illustrates a schematic diagram of simulating a rebuilding process for the RG 710 of FIG. 7 based on the conventional RAID according to the embodiments of the present disclosure. Based on the analysis above, it may be derived that simulation of the rebuilding process for the RG 710 shown in FIG. 7 needs to satisfy the following requirements: (1) using only one source RG because as illustrated in FIG. 8, all read requests are only directed to one source RG; and (2) using more than one spare disk, because as illustrated in FIG. 8, data will be distributed rebuilt into a plurality of disks (of a plurality of sub-RGs). FIG. 9 illustrates RG 910 which is a conventional RAID 5 with 4D+1P, and includes $930_1, 930_2, \ldots, 930_4$. The RG 910 as a source RG is used for simulating the rebuilding process for the RG 710 illustrated in FIG. 7, and all read requests are directed to the RG 910. Besides, FIG. 8 also illustrates 4 spare disks $930_5, 930_6, 930_7$, and $930_8$ and 4 IO generators $920_0, 920_1, 920_2$, and $920_3$. According to the embodiments of the present disclosure, RG 910 may be used to simulate the rebuilding process for the RG 710 as illustrated in FIG. 7. First, a disk (e.g., disk $930_2$) in the RG 910 may be disabled and rebuilding of the RG 910 may be disabled, such that the RG 910 is in a degraded state. Then, a read request may be initiated for data in the disabled disk $930_2$ via the IO generator. For example, 4 IO generators $920_0, 920_1, 920_2$, and $920_3$ may be used to initiate concurrently a read request for data in 25% of data areas of the disk $930_2$, such that the read IO load is substantially identical to the simulated mapped RG (i.e., the RG 710 shown in FIG. 7). Next, in response to receiving the requested data, the requested data are written into the spare disk via the IO generator. For example, 4 IO generators $920_0, 920_1, 920_2$, and $920_3$ may be used to write concurrently the requested data into the 4 spare disks $930_5, 930_6, 930_7$, and $930_8$, such that the write IO load is substantially identical to the simulated mapped RG.

A first performance metric of the simulated rebuilding process may be obtained through simulating the rebuilding process for the mapped RAID shown in FIG. 9. According to the embodiments of the present disclosure, a plurality of performance metrics may be obtained by changing the configuration parameters used by the simulation. For example, the number of the IO generators in use (e.g., 8 IO generators are used) and/or the number of spare disks (e.g., 8 spare disks are used) may be changed to re-simulate the rebuilding process for the mapped RAID so as to obtain the second performance metric. Additionally or alternatively, a factor that affects the rebuilding performance of the mapped RAID may be identified by comparing the first and the second performance metric. For example, in the example as shown in FIG. 9, it may be derived through comparison that increasing the number of IO generators from 4 to 8 will not enhance the rebuilding performance of the mapped RAID; while increasing the number of spare disks from 4 to 8 will significantly enhance the rebuilding performance of the RAID. Therefore, it may be derived that the write IO is a factor that affects the rebuilding performance of the mapped RAID as shown in FIG. 7.

Figure 10:
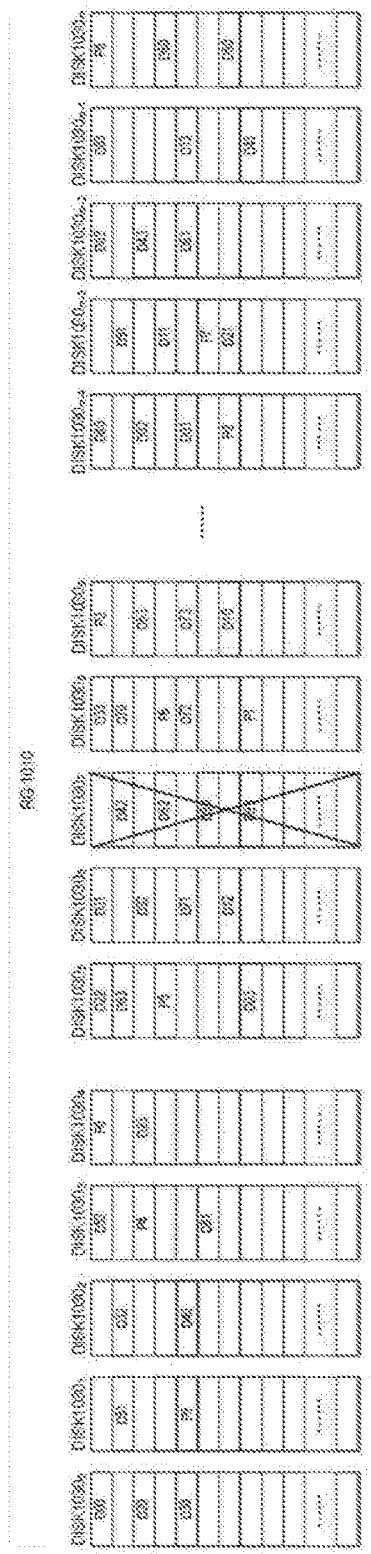
FIG. 10 illustrates a schematic diagram of a mapped RAID having another kind of configuration.

FIG. 10 illustrates a schematic diagram of a mapped RAID with another type of configuration. FIG. 10 illustrates a RG 100 that uses m+1 disks, i.e., disks $1020_0$, $1020_1, \ldots, 1020_m$. The m+1 disks are segmented into small blocks, and RAID entries are totally randomly distributed in these blocks. When one disk in the RG 1010 fails, e.g., the disk $1020_7$ shown in FIG. 10 fails, the pre-read IO for rebuilding is distributed to almost all disks. With the rebuilding data D42 as an example, it is needed to read data D40 from the disk $1020_2$, read data P4 from the disk $1020_3$, read data D41 from the disk $1020_{m-1}$, and read data D43 from the disk $1020_{m-2}$. It may be seen from FIG. 10 that rebuilding of the mapped RAID for this configuration has the following features: (1) concurrent or distributed rebuilding, i.e., the associated stripes may be rebuilt onto a plurality of disks, instead of a specific spare disk for the conventional RAID; (2) during the rebuilding process, the pre-read operation will be directed to all disks.

Figure 11:
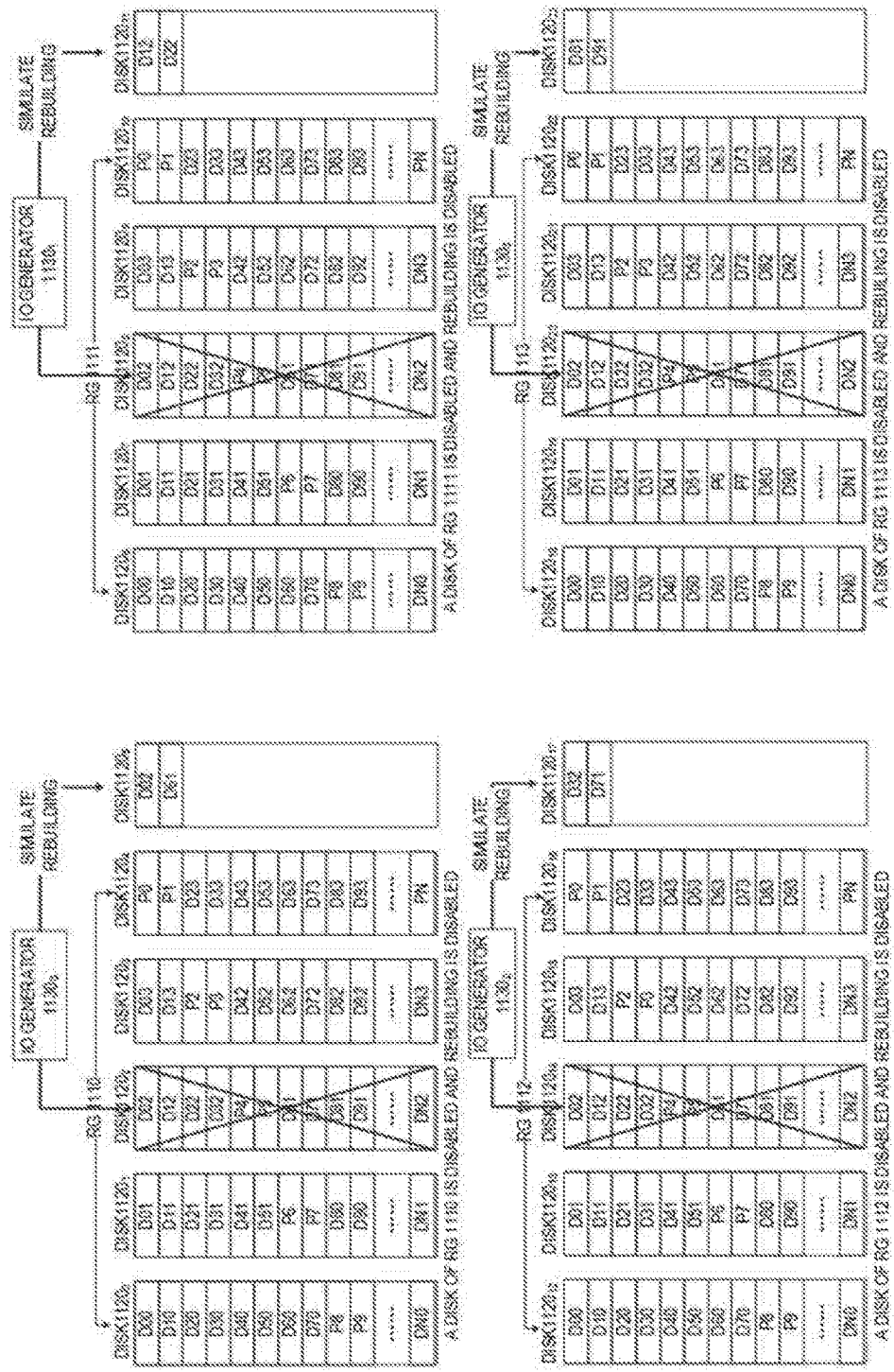
FIG. 11 illustrates a schematic diagram of simulating a rebuilding process for the mapped RAID based on the conventional RAID according to the embodiments of the present disclosure.

Based on the features above, the rebuilding process for the RG 1010 as shown in FIG. 10 may be simulated using an IO generator based on the conventional RAID, thereby obtaining the performance metric of its rebuilding. For example, FIG. 11 illustrates a schematic diagram of simulating the rebuilding process for the RG 1010 as shown in FIG. 10 based on the conventional RAID according to the embodiments of the present disclosure. Based on the analysis above, it may be derived that simulation of the rebuilding process for the RG 1010 as illustrated in FIG. 10 needs to satisfy the following requirements: (1) using a plurality of source RGs; and (2) using more than one spare disk. FIG. 11 illustrates 4 RGs, i.e., RG 1110, RG 1111, . . . . RG 1113, each RG being a conventional RAID 5 with 4D+1P. For example, the RG 1110 uses disks $1120_0, 1120_1, \ldots, 1120_4$, RG 1111 uses disks $1120_6, 1120_7, \ldots, 1120_{10}$, RG 1112 uses disks $1120_{12}$, $1120_{13}, \ldots, 1120_{16}$, and RG 1113 uses disks $1120_{18}$, $1120_{19}, \ldots, 1120_{22}$. RG 1110, RG 1111, . . . . RG 1113 as source RGs are used for simulating the rebuilding process for the RG 1010 shown in FIG. 10. Besides, FIG. 11 also illustrates 4 spare disks $1120_5, 1120_{11}, 1120_{17}$, and $1120_{23}$, and 4 IO generators $1130_0, 1130_1, \ldots, 1130_3$. According to the embodiments of the present disclosure, RG 1110, RG 1111, . . . , RG 1113 may be used to simulate the rebuilding process for the RG 1010 shown in FIG. 10. First, a plurality of disks (e.g., disks $1120_2, 1120_8, 1120_{14}$, and $1120_{20}$) in RG 1110, RG1111, . . . RG1113 may be concurrently disabled, and rebuilding of the RG 1110, RG1111, . . . , RG 1113 are simultaneously disabled, such that the RG 1110, RG1111, . . . , RG 1113 are simultaneously in the degraded state. Then, a plurality of read request are concurrently initiated for a plurality of data in the plurality of disabled disks (i.e., disk $1120_2, 1120_8, 1120_{14}$, and $1120_{20}$) via 4 IO generators $1130_0, 1130_1, \ldots, 1130_3$. For example, a read request may be concurrently initiated for data in 25% data area of each disk of the disks $1120_2, 1120_8, 1120_{14}$, and $1120_{20}$ using 4 IO generators $1130_0, 1130_1, \ldots, 1130_3$, such that the read IO load is substantially identical to the simulated mapped RG (i.e., RG 1010 as shown in FIG. 10). Next, in response to receiving the requested plurality of data, the requested plurality of data are concurrently written into 4 spare disks 1120$_5$, 1120$_{11}$, 1120$_{17}$, and 1120$_{23}$ via 4 IO generators 1130$_0$, 1130$_1$, . . . , 1130$_3$.

A first performance metric of the simulated rebuilding process may be obtained by simulating the rebuilding process for the mapped RAID as shown in FIG. 11. According to the embodiments of the present disclosure, a plurality of performance metric may be obtained by changing the configuration parameters used in the simulation. For example, the number of IO generators in use (e.g., 8 IO generators are used) and/or the number of spare disks (e.g., 8 spare disks are used) may be changed to re-simulate the rebuilding process for the mapped RAID to obtain a second performance metric. Additionally or alternatively, a factor that affects the rebuilding performance of the mapped RAID may be identified by comparing the first the second performance metric. For example, in the example as shown in FIG. 11, it may be obtained through comparison that increasing the number of IO generators from 4 to 8 may enhance the rebuilding performance of the mapped RAID; and increasing the number of spare disks from 4 to 8 may significantly enhance the rebuilding performance of the RAID. Therefore, it may be derived that the read IO and the write IO are both factors that affect the rebuilding performance of the mapped RAID as illustrated in FIG. 10.

Additionally or alternatively, the rebuilding performances obtained by simulating the mapped RAIDs with different configurations may be compared to determine a specific implementation direction of the mapped RAID. For example, by comparing the obtained rebuilding performance of the RG 710 shown in FIG. 7 and the rebuilding performance of the RG 1010 shown in FIG. 10, it may be derived that the RG 1010 as shown in FIG. 10 has a better rebuilding performance, and thus the configuration of the RG 1010 may be determined as a better configuration for the mapped RAID.

Besides, in the Chinese patent application No. 201610103823.6 entitled "Method and Device for Guaranteeing Reliability of Redundant Array of Independent Disks," which was filed on Feb. 25, 2016, mentioned a relationship between the rebuilding rate of the mapped RAID and its reliability and a relationship between the number of disks and its reliability. Therefore, without specific implementation of the mapped RAID, based on its rebuilding performance obtained by simulating the mapped RAID according to the embodiments of the present disclosure, it may be determined whether the rebuilding rate of the mapped RAID can satisfy its requirements of reliability.

Figure 12:
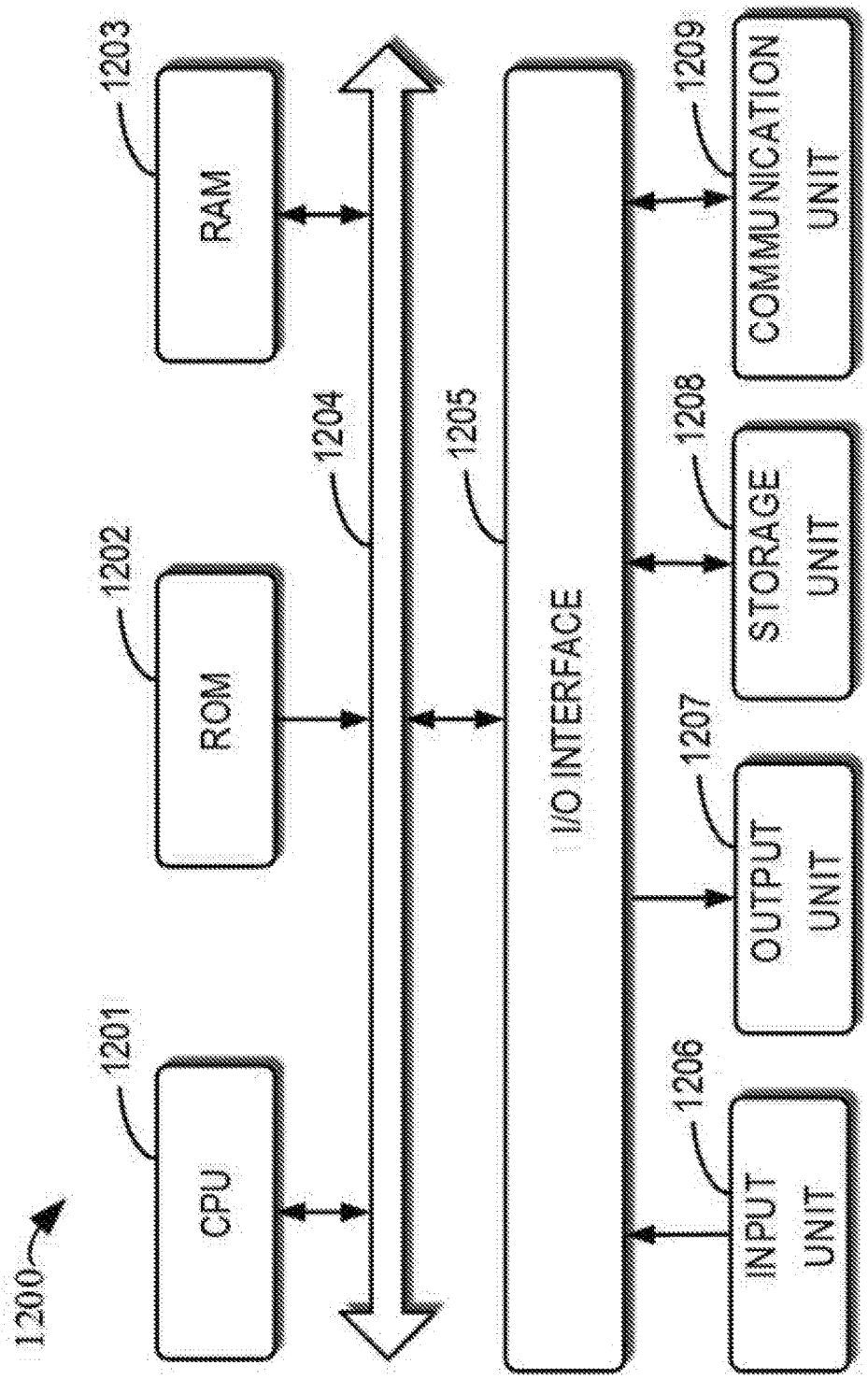
FIG. 12 illustrates a schematic block diagram of an device 1300 that may be used to implement the embodiments of the present disclosure.

FIG. 12 illustrates a schematic block diagram of an device 1200 that may be used to implement the embodiments of the present disclosure. As illustrated in the figure, the device 1200 comprises a central processing unit (CPU) 1201 which may perform various types of actions and processes according to computer program instructions stored in a read-only memory (ROM) 1202 or computer program instructions loaded into the random access memory (RAM) 1203 from the storage unit 1208. Various types of programs and data needed by operations of the device 1200 may be stored in RAM 1203. CPU 1201. ROM 1202, and RAM 1203 are connected with each other via a bus 1204. The input/output (I/O) interface 1205 may also be connected to the bus 1204.

A plurality of components in the device 1200 are connected to the I/O interface 1205, comprising: an input unit 1206, e.g., a keyboard, a mouse, etc.; an output unit 1207, e.g., various types of displays, loudspeakers, etc.; a storage unit 1208, e.g., a magnetic disk, an optic disk, etc.; and a communication unit 1209, e.g., a network card, a modem, a wireless communication transceiver, etc. The communication unit 1209 allows the device 1200 to exchange information/data with other devices through a computer network such as Internet and/or various types of telecommunication networks.

Various procedures and processes described above, e.g., at least one of methods 400 and 500, may be executed by the processing unit 1201. For example, in some embodiments, at least one of the methods 400 and 500 may be implemented as computer software program which is tangibly included in a machine readable medium, e.g., a storage unit 1208. In some embodiments, part or entire of the computer program may be loaded and/or mounted onto the device 1200 via ROM 1202 and/or a communication unit 1209. When the computer program is loaded to the RAM 1203 and executed by the CPU 1201, one or more steps of at least one of the method 400 and method 500 described above may be executed.

In view of the above, the embodiments of the present disclosure provide a solution for evaluating rebuilding performance of the redundant arrays of independent disks. Compared with the prior art, the embodiments of the present disclosure can simulate the rebuilding process for the mapped RAID based on the conventional RAID technology, thereby being capable of evaluating its rebuilding performance without implementing the specific mapped RAID. Besides, the embodiments of the present disclosure can identify the factor that affect the rebuilding performance of the mapped RAID, thereby being capable of providing a correct direction and a reasonable suggestion for specific implementation of the mapped RAID.

The present disclosure may be a method, an device, and/or a computer program product. The computer program product may include a computer readable storage medium (or media) having computer readable program instructions thereon for carrying out aspects of the present disclosure.

The computer readable storage medium can be a tangible device that can retain and store instructions used by an instruction execution device. The computer readable storage medium may be, for example, but is not limited to, an electrical storage device, a magnetic storage device, an optical storage device, an electromagnetic storage device, a semiconductor storage device, or any suitable combination thereof. More specific examples (a non-exhaustive list) of the computer readable storage medium include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punched cards or bump structure in a groove with instructions being stored thereon, and any suitable combination thereof. A computer readable storage medium, as used herein, is not to be construed as transitory signals per se, such as radio waves or other free propagation electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network such as Internet, a local area network, a wide area network and/or a wireless network. The network may comprise copper transmission cables, optical fiber transmission, wireless transmission, routers, firewalls, switches, gateway computers and/or edge servers. A network adapter card or network interface in each computing/processing device receives computer readable program instructions from the network and forwards the computer readable program instructions for storing in a computer readable storage medium of the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or source code or object code written in any combination of one or more programming languages, including an object oriented programming language such as Smalltalk, C++, or the like, and conventional procedural programming languages, such as the "C" programming language or similar programming languages. The computer readable program instructions may be executed entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or may be connected to an external computer (for example, through the Internet using an Internet Service Provider). In some embodiments, electronic circuitry including, for example, programmable logic circuitry, field-programmable gate arrays (FPGA), or programmable logic arrays (PLA) may be personalized by utilizing state information of the computer readable program instructions, thereby implementing aspects of the present disclosure.

Various aspects of the present disclosure are described with reference to the flowcharts and/or block diagrams of the method, device and computer program products according to the embodiments of the present disclosure. It will be understood that both each block of the flowcharts and/or block diagrams, and combinations of blocks in the flowchart and/or block diagrams, can be implemented by computer readable program instructions.

These computer readable program instructions may be provided to a processor of the general purpose computer, the special purpose computer, or other programmable data processing means to produce a machine, such that the instructions, which executed via the processor of the computer or other programmable data processing means, create means for implementing the functions/acts specified in one or more blocks of the flowcharts and/or block diagrams. These computer readable program instructions may also be stored in a computer readable storage medium. These instructions can cause a computer, a programmable data processing means, and/or other devices to function in a particular manner, such that the computer readable storage medium having instructions stored thereon comprises an article of manufacture including instructions for implementing aspects of the functions/acts specified in one or more blocks of the flowcharts and/or block diagrams.

The computer readable program instructions may also be loaded onto a computer, other programmable data processing means, or other device to cause a series of operation steps to be performed on the computer, other programmable data processing means or other device to produce a computer implemented process, such that the instructions which are executed on the computer, other programmable data processing means, or other device implement the functions/acts specified in one or more blocks of the flowcharts and/or block diagrams.

The flowcharts and block diagrams in the Figures illustrate the architecture, functionality, and operation of possible implementations of systems, methods and computer program products according to various embodiments of the present disclosure. In this regard, each block of the flowcharts or block diagrams may represent a module, a program segment, or a portion of instruction. The module, the program segment and or portion of instruction comprises one or more executable instructions for implementing the specified logical function(s). It should also be noted that, in some alternative implementations, the functions noted in blocks may occur in different orders from that noted in the figures. For example, two blocks shown in succession may, in fact, be executed substantially concurrently, or the blocks may sometimes be executed in a reverse order, depending upon the functionality involved. It will also be noted that each block of the block diagrams and/or flowcharts, and combinations of blocks of the block diagrams and/or flowcharts, can be implemented by special purpose hardware-based systems that perform the specified functions or acts, or by combinations of special purpose hardware and computer instructions.

The descriptions of the various embodiments of the present disclosure have been presented for purposes of illustration. The descriptions are not exhaustive and limited to the embodiments disclosed. Many modifications and variations will be apparent to those ordinary skilled in the art without departing from the scope and spirit of the described embodiments. The terminologies used herein are intended to best explain the principles of the embodiments, the practical application or technical improvement over technologies in the marketplace, or to enable other ordinary skilled in the art to understand the various embodiments disclosed herein.

We claim:

1. A computer-implemented method, comprising:
    simulating, based on a first group of redundant arrays of independent disks (RAID), a rebuilding process for a second group of redundant arrays of independent disks, wherein the first group and the second group of redundant arrays of independent disks each include, respectively, a plurality of sub-RAID groups (sub-RGs);
    obtaining a first performance metric, of a plurality of performance metrics, of the simulated rebuilding process, wherein during the simulated rebuilding process, a pre-reading operation is directed to at least one of a respective group of redundant arrays of independent disks and a respective sub-RAID group of the plurality of sub-RAID groups; and
    identifying, based on the first performance metric, a factor associated with rebuilding performance of the second group of redundant arrays of independent disks.

2. The method according to claim 1, wherein the first group of redundant arrays of independent disks includes a group of conventional redundant arrays of independent disks, and the second group of redundant arrays of independent disks includes a group of mapped redundant arrays of independent disks.

3. The method according to claim 1, wherein simulating the rebuilding process for the second group of redundant arrays of independent disks comprises:
    disabling a disk in the first group of redundant arrays of independent disks and disabling rebuilding of the first group of redundant arrays of independent disks;

initiating, via an input output generator, a read request for data in the disabled disk concurrently, such that a read IO load is identical to a simulated mapped redundant array of independent disks; and in response to receiving the requested data, writing the requested data concurrently into a spare disk via the input output generator such that a written IO load is identical to the simulated mapped redundant arrays of independent disks.

4. The method according to claim 3, wherein the input output generator includes a common input output generator or a private input output generator.

5. The method according to claim 3, wherein the input output generator is used for initiating at least one of a read request and a write request for at least one of the following: a volume, a logic unit number, a group of redundant arrays of independent disks, and a disk.

6. The method according to claim 1, wherein simulating the rebuilding process for the second group of redundant arrays of independent disks comprises:

disabling a plurality of disks in one or more first groups of redundant arrays of independent disks;

disabling rebuilding of the one or more first groups of redundant arrays of independent disks;

initiating, via a plurality of input output generators, a plurality of read requests for a plurality of data in the plurality of disabled disks concurrently; and in response to receiving the requested plurality of data, writing the requested plurality of data concurrently into one or more spare disks via the plurality of input output generators.

7. The method according to claim 6, further comprising:
re-simulating the rebuilding process for the second group of redundant arrays of independent disks by changing at least one of the following: the number of the plurality of input output generators, and the number of the one or more spare disks.

8. The method according to claim 1, wherein obtaining the first performance metric of the simulated rebuilding process comprises:

obtaining at least one of the following performance metrics of the simulated rebuilding process: rebuilding rate, usage of a central processing unit, and usage of memory.

9. The method according to claim 7, wherein obtaining the first performance metric of the simulated rebuilding process comprises:

obtaining a second performance metric of the re-simulated rebuilding process.

10. The method according to claim 9, wherein identifying the factor comprises:

identifying the factor associated with the rebuilding performance of the second group of redundant arrays of independent disks by comparing the first and second performance metrics.

11. An electronic device, comprising:
at least one processing unit; and
at least one memory coupled to the at least one processing unit with instructions being stored thereon, the instructions, when executed by the at least one processing unit, performing actions including:

simulating, based on a first group of redundant arrays of independent disks (RAID), a rebuilding process for a second group of redundant arrays of independent disks, wherein the first group and the second group of redundant arrays of independent disks each include, respectively, a plurality of sub-RAID groups (sub-RGs);

obtaining a first performance metric, of a plurality of performance metrics, of the simulated rebuilding process, wherein during the simulated rebuilding process, a pre-reading operation is directed to at least one of a respective group of redundant arrays of independent disks and a respective sub-RAID group of the plurality of sub-RAID groups configuration; and identifying, based on the first performance metric, a factor associated with rebuilding performance of the second group of redundant arrays of independent disks.

12. The device according to claim 11, wherein the first group of redundant arrays of independent disks includes a group of conventional redundant arrays of independent disks, and the second group of redundant arrays of independent disks includes a group of mapped redundant arrays of independent disks.

13. The device according to claim 11, wherein simulating the rebuilding process for the second group of redundant arrays of independent disks comprises:

disabling a disk in the first group of redundant arrays of independent disks and disabling rebuilding of the first group of redundant arrays of independent disks;

initiating, via an input output generator, a read request for data in the disabled disk concurrently, such that a read TO load is identical to a simulated mapped redundant array of independent disks; and in response to receiving the requested data, writing the requested data concurrently into a spare disk via the input output generator such that a written TO load is identical to the simulated mapped redundant arrays of independent disks.

14. The device according to claim 13, wherein the input output generator includes a common input output generator or a private input output generator.

15. The device according to claim 13, wherein the input output generator is used for initiating at least one of a read request and a write request for at least one of the following: a volume, a logic unit number, a group of redundant arrays of independent disks, and a disk.

16. The device according to claim 11, wherein simulating the rebuilding process for the second group of redundant arrays of independent disks further comprises:

disabling a plurality of disks in one or more first groups of redundant arrays of independent disks, and disabling rebuilding of the one or more first groups of redundant arrays of independent disks;

initiating, via a plurality of input output generators, a plurality of read requests for a plurality of data in the plurality of disabled disks concurrently; and in response to receiving the requested plurality of data, writing the requested plurality of data concurrently into one or more spare disks via the plurality of input output generators.

17. The device according to claim 16, wherein the actions further include:

re-simulating the rebuilding process for the second group of redundant arrays of independent disks by changing at least one of the following: the number of the plurality of input output generators, and the number of the one or more spare disks.

18. The device according to claim 11, wherein obtaining the first performance metric of the simulated rebuilding process comprises:

obtaining at least one of the following performance metrics of the simulated rebuilding process: rebuilding rate, usage of a central processing unit, and usage of memory.

19. The device according to claim 17, wherein obtaining the first performance metric of the simulated rebuilding process comprises:

obtaining a second performance metric of the re-simulated rebuilding process.

20. The device according to claim 19, wherein identifying the factor comprises:

identifying the factor associated with the rebuilding performance of the second group of redundant arrays of independent disks by comparing the first and second performance metrics.

* * * * *